Jan. 10, 1928.
H. T. ODEAN
ANTISKID DEVICE
Filed Jan. 11, 1927
1,655,508
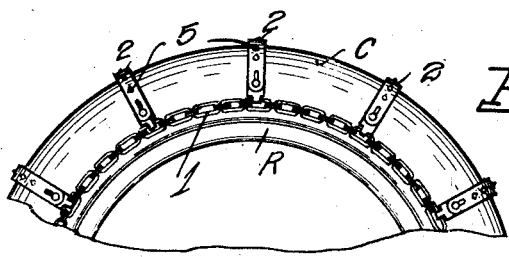
Fig.1
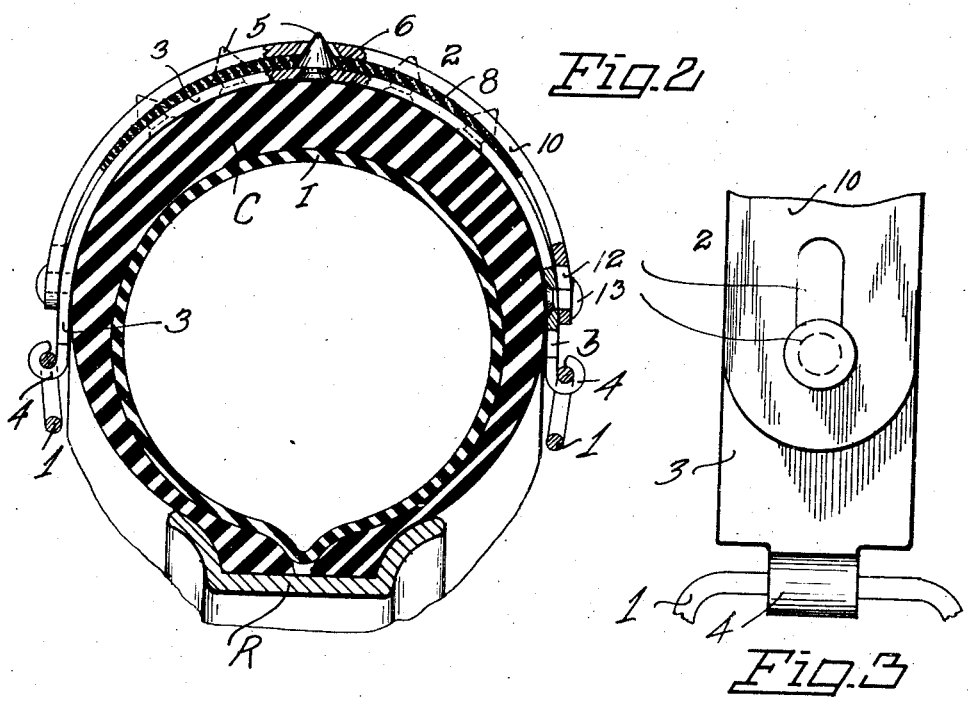
Fig.2
Fig.3
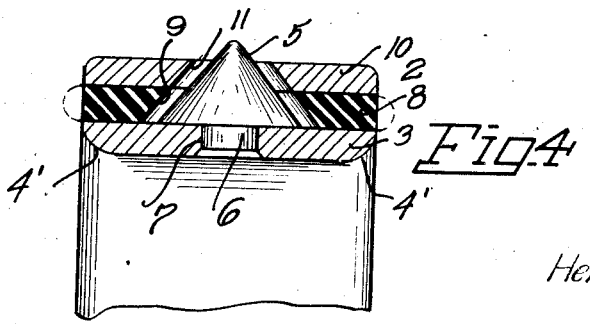
Fig.4
Inventor
Henry T. Odean
Herbert E. Smith
By
Attorney Patented Jan. 10, 1928.

1,655,508

UNITED STATES PATENT OFFICE.

HENRY T. ODEAN, OF SPOKANE, WASHINGTON, ASSIGNOR OF ONE-THIRD TO ARTHUR E. LARSON AND ONE-THIRD TO HERMAN C. CHRISTIANSON, BOTH OF SPOKANE, WASHINGTON.

ANTISKID DEVICE.

Application filed January 11, 1927. Serial No. 160,363.

My present invention relates to improvements in anti-skid devices usually known as tire chains for use with pneumatic tires of wheels for automotive vehicles. The primary object of my invention is the provision of a device of this character that is effectual in the performance of its functions when the wheels are passing over hard roads as well as when the wheels are passing over soft roads or surfaces. Thus the anti-skid device is provided with spikes or studs for engagement with a hard surfaced and smooth road, and means are provided whereby when the wheels are passing over a soft or irregular road, a greater portion, or effective area, of the spikes or studs are brought into use to become effective under the changed conditions.

The invention consists in certain novel combinations and arrangements of parts involved in the cross pieces of the detachable anti-skid device as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a view in side elevation showing a portion of a pneumatic tire with a portion of the anti-skid device or tire-belt on the tire in position for use.

Figure 2 is an enlarged, transverse sectional view of a tire and rim showing the side chains and part of the cross strap in section.

Figure 3 is an enlarged detail view showing the means for anchoring the ends of the cross straps to the side chains.

Figure 4 is a transverse, detail sectional view through one of the cross straps of the tire-belt at a stud.

In order that the general relation and arrangement of parts may readily be understood attention is called to Figures 1 and 2 and especially Figure 2 wherein the usual tire casing C, inner tube I and rim R are shown. In Figure 1 one of a pair of usual side chains 1 is shown, and it will be understood that two of the side chains are employed by me for attaching and detaching the tire-belt or anti-skid device of my invention. These side chains may be provided with suitable fastening devices for connecting their free ends and the side chains are joined by transversely extending straps, spaced apart, and indicated as a whole by the numeral 2. These straps of cross-pieces pass around the tread of the tire casing and are flexible and resilient in order that they may conform to the changes in formation of the pneumatic tire of the wheel as it travels or rolls over the road.

Each strap or cross piece comprises an inner strap 3 of resilient metal at the ends of which are formed hooks 4 by means of which the strap 3 and the entire cross-piece also, are anchored to the two side chains 1. The edges 4' of the base strap are rounded as indicated in Figure 4 to avoid cutting or excessive wear of the strap on the exterior of the tire casing.

Each base strap 4 is provided with a number of pointed studs 5, four being here shown, and spaced apart at regular intervals. The points of the studs 5 contact at all times with surface of the roadway, and in Figures 2 and 4 these points are projecting a sufficient distance beyond the outer face of the cross piece for effectual use to prevent skidding on a hard roadway or surface.

Each stud is provided with a rivet 6 passed through an opening or socket in the base strap of the cross piece and the rivet is headed at 7 to secure the stud in rigid relation to the base strap.

A strip of resilient material as rubber or other suitable material is used as a pad 8 and lies against the outer face of the base strap. This cushion is perforated as at 9 to accommodate the studs and it is adapted to be compressed between the base strap 4 and an outer strap 10, as indicated by dotted lines in Figure 4. After its compression when the load is relieved therefrom the resilient cushion expands to normal position.

The outer strap 10 is also of resilient, flexible metal and provided with perforations 11 for the points of the studs. Near its ends are fashioned slots 12 and headed rivets 13 rigid with the base strap retain the slotted outer strap on the cross piece but permit it to have slight movement due to flexing of the cross-piece. It will be apparent that as the outer strap 10 contacts with the soft roadway or surface the weight of a car will compress the pad or cushion 8 thus uncovering and exposing a greater area of the studs for effective anti-skid use.

Having thus fully described my invention, what I claim as new and desire to secure by Letters Patent is—

1. In an anti-skid device a cross-piece comprising a base strap and stud rigid therewith, an outer perforated strap anchored to the base strap, and a perforated cushion between said straps whereby when the cushion is compressed a greater portion of the stud is exposed for use.

2. A cross piece for an anti-skid device comprising a base strap having a stud thereon, a perforated outer strap through which the stud normally projects, means for anchoring the ends of the outer strap to the base strap, and a perforated, resilient, pad interposed between said straps.

3. A cross piece for an anti-skid device comprising a base strap and a stud thereon, a perforated outer strap having slotted ends and headed rivets on the base strap co-acting with said slotted ends, and an intermediate, perforated, resilient pad or cushion.

In testimony whereof I affix my signature.

HENRY T. ODEAN.